(12) United States Patent
Ueno

(10) Patent No.: US 12,330,848 B2
(45) Date of Patent: Jun. 17, 2025

(54) CONTAINER FOR CONTAINING CELLULOSE RESIN COMPOSITION AND PACKAGE COMPRISING SAME AND CELLULOSE RESIN COMPOSITION

(71) Applicant: Asahi Kasei Kabushiki Kaisha, Tokyo (JP)

(72) Inventor: Koichi Ueno, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 666 days.

(21) Appl. No.: 17/608,227

(22) PCT Filed: May 21, 2020

(86) PCT No.: PCT/JP2020/020184
§ 371 (c)(1),
(2) Date: Nov. 2, 2021

(87) PCT Pub. No.: WO2020/235653
PCT Pub. Date: Nov. 26, 2020

(65) Prior Publication Data
US 2022/0250818 A1    Aug. 11, 2022

(30) Foreign Application Priority Data

May 21, 2019  (JP) ................................. 2019-095464

(51) Int. Cl.
| | | |
|---|---|---|
| *B65D 65/38* | (2006.01) | |
| *B65D 5/60* | (2006.01) | |
| *B65D 30/08* | (2006.01) | |
| *B65D 81/24* | (2006.01) | |
| *C08L 1/02* | (2006.01) | |
| *C08L 97/02* | (2006.01) | |
| *D21C 3/00* | (2006.01) | |
| *D21H 11/18* | (2006.01) | |

(52) U.S. Cl.
CPC ............... *B65D 65/38* (2013.01); *B65D 5/60* (2013.01); *B65D 31/04* (2013.01); *B65D 81/24* (2013.01); *C08L 1/02* (2013.01); *C08L 97/02* (2013.01); *D21C 3/00* (2013.01); *D21H 11/18* (2013.01)

(58) Field of Classification Search
CPC .......... B65D 31/02; B65D 31/04; B65D 5/56; B65D 5/60; B65D 65/38; B65D 81/24; C08L 1/02; C08L 97/02; D21C 3/00; D21H 11/18; D21H 27/10
See application file for complete search history.

(56) References Cited

U.S. PATENT DOCUMENTS

| | | | | |
|---|---|---|---|---|
| 5,039,003 A * | 8/1991 | Gordon | ................ | B65D 5/6626 |
| | | | | 229/148 |
| 2008/0296189 A1 | 12/2008 | Walters | | |
| 2010/0125112 A1 * | 5/2010 | Chung | ........................ | C08J 5/06 |
| | | | | 524/502 |
| 2013/0005869 A1 | 1/2013 | Yano et al. | | |
| 2016/0376750 A1 | 12/2016 | Miikki et al. | | |
| 2018/0186541 A1 | 7/2018 | Jones et al. | | |
| 2018/0362405 A1 * | 12/2018 | Tsujii | ........................ | C08K 5/21 |
| 2019/0031858 A1 | 1/2019 | Kozawa et al. | | |
| 2020/0062910 A1 | 2/2020 | Wada et al. | | |
| 2022/0250818 A1 | 8/2022 | Ueno | | |

FOREIGN PATENT DOCUMENTS

| | | |
|---|---|---|
| CN | 107002367 A | 8/2017 |
| CN | 108884328 A | 11/2018 |
| JP | S53-146895 A | 12/1978 |
| JP | S59-021791 A | 2/1984 |
| JP | S59-183845 U | 12/1984 |
| JP | H08-119292 A | 5/1996 |
| JP | H08-269291 A | 10/1996 |
| JP | H09-510512 A | 10/1997 |
| JP | H11-348035 A | 12/1999 |
| JP | 2000-143946 A | 5/2000 |
| JP | 2000-318107 A | 11/2000 |

(Continued)

OTHER PUBLICATIONS

Report of Commissioned work for performance determination of cellulose nanofiber recycle, fiscal 2018 (Recycling property of automobile parts using cellulose nanofiber) (2019) (see English summary).
Seikei-Kakou (Molding Process), vol. 30, No. 7, (2018) (see partial English translation).
JIS P 8211 (Mar. 22, 2011) (see partial English translation).
Supplementary European Search Report issued in corresponding European Patent Application No. 20810426.5 dated Jul. 19, 2022.
"Pulp Bleaching," Tadao Butter, pp. 1-2, Light Industry Press, Nov. 1983 (see CN OA).
Hoogura et al., Structure and Properties of Sheet, China Light Industry Press, 297-299, Jan. 2006 (see CN OA).
Office Action issued in Chinese Patent Application No. 202080035232.4 dated Jul. 29, 2022.

(Continued)

*Primary Examiner* — Yan Lan
(74) *Attorney, Agent, or Firm* — Morgan, Lewis & Bockius LLP

(57) ABSTRACT

The purpose of the present invention is to provide: a container in which a cellulose resin composition can be stored without discoloring with the lapse of time; a package comprising a cellulose resin composition and the container; a method in which a cellulose resin composition is inhibited from discoloring by using the container; and a method for producing a molded resin object, the method including using the container. The container, which is for containing a cellulose resin composition comprising a thermoplastic resin and cellulose, includes a high-lignin-content member, which has a lignin content of 10 mass % or higher, and a low-lignin-content member, which has a lignin content of 1 mass % or less, and has a surface to be in contact with the cellulose resin composition, the whole of the surface being constituted of the low-lignin-content member.

23 Claims, No Drawings

(56) References Cited

FOREIGN PATENT DOCUMENTS

| | | |
|---|---|---|
| JP | 2000-336590 A | 12/2000 |
| JP | 2003-095246 A | 4/2003 |
| JP | 2004-189288 A | 7/2004 |
| JP | 2004-224395 A | 8/2004 |
| JP | 2005-060855 A | 3/2005 |
| JP | 3907650 B2 | 4/2007 |
| JP | 2007-254900 A | 10/2007 |
| JP | 2009-019200 A | 1/2009 |
| JP | 2010-121131 A | 6/2010 |
| JP | 2010-202997 A | 9/2010 |
| JP | 2010-229564 A | 10/2010 |
| JP | 2011-162608 A | 8/2011 |
| JP | 2012-011651 A | 1/2012 |
| JP | 2012-102162 A | 5/2012 |
| JP | 2013-018916 A | 1/2013 |
| JP | 2013-245343 A | 12/2013 |
| JP | 2015-518907 A | 7/2015 |
| JP | 2016-094541 A | 5/2016 |
| JP | 2017-105983 A | 6/2017 |
| JP | 2017-141323 A | 8/2017 |
| JP | 2018-104702 A | 7/2018 |
| JP | 2020-007495 A | 1/2020 |
| WO | 95/25844 A1 | 9/1995 |
| WO | 2007/029723 A1 | 3/2007 |
| WO | 2013/170236 A2 | 11/2013 |
| WO | 2014/087801 A1 | 6/2014 |
| WO | 2015/002074 A1 | 1/2015 |
| WO | 2017/089504 A1 | 6/2017 |
| WO | 2018/123959 A1 | 7/2018 |
| WO | 2020/235653 A1 | 11/2020 |

OTHER PUBLICATIONS

International Search Report issued in corresponding International Patent Application No. PCT/JP2020/020184 dated Aug. 4, 2020.
International Preliminary Report on Patentability and Written Opinion issued in corresponding International Patent Application No. PCT/JP2020/020184 dated Dec. 2, 2021.

* cited by examiner

CONTAINER FOR CONTAINING CELLULOSE RESIN COMPOSITION AND PACKAGE COMPRISING SAME AND CELLULOSE RESIN COMPOSITION

FIELD

The present invention relates to a container for containing a cellulose resin composition, to a package comprising the container and a cellulose resin composition, to a method for inhibiting discoloration during storage of a cellulose resin composition, and to a method for producing a molded resin that comprises a cellulose resin composition.

BACKGROUND

When resin compositions have been transported in the prior art, it has been common for the resin compositions, in the form of processing materials (such as pellets or powder) or molded products, to be housed in containers such as boxes or bags, and kraft paper is widely used as a material for such containers because of its light weight and low cost. PTL 1, for example, describes a paper packaging material for polyamide fibers or resins, or products that comprise them. The package described in PTL 1 is able to prevent, to some extent, yellowing of polyamide fibers or resins, or products comprising them.

CITATION LIST

Patent Literature

[PTL 1] Japanese Unexamined Patent Publication SHO No. 53-146895

SUMMARY

Technical Problem

Many resin compositions obtained using cellulose as a reinforcing material have been proposed in recent years, and kraft paper is among the materials used as containers for storage and transport of the resin compositions. However, when a resin composition including a thermoplastic resin and cellulose (also to be referred to as "cellulose resin composition" in the present disclosure) is stored in a container made of a paper material, it has been a problem that discoloration of the cellulose resin composition tends to occur more readily than a cellulose-free resin composition, resulting in unique odors being generated during molding, or difficulty in molding.

It is an object of the present invention to solve this problem by providing a container that can store a cellulose resin composition without discoloration occurring with time, a package comprising the container and a cellulose resin composition, a method for inhibiting discoloration of a cellulose resin composition using the container, and a method for producing a molded resin that includes using the container.

Solution to Problem

As a result of ardent research with the aim of solving the problems described above, the present inventors have completed this invention upon finding that it is possible to inhibit discoloration of a cellulose resin composition with time by housing the cellulose resin composition in a container having a specific construction.

Specifically, the present invention encompasses the following aspects.

[1] A container for containing a cellulose resin composition that includes a thermoplastic resin and cellulose, wherein:
  the container comprises a high-lignin-content member with a lignin content of 10 mass % or greater and a low-lignin-content member with a lignin content of 1 mass % or lower, and
  the whole of the surface of the container to be in contact with the cellulose resin composition is constituted of the low-lignin-content member.

[2] The container according to aspect 1, wherein:
  the lignin content (Lc) of the cellulose is 20 mass % or lower, and
  the lignin content (Lo) of the high-lignin-content member, the lignin content (Li) of the low-lignin-content member and the lignin content (Lc) of the cellulose satisfy the relationship represented by the following formula:

$$Lo > Lc \geq Li.$$

[3] The container according to aspect 1 or 2, wherein the water vapor permeability of the low-lignin-content member as measured by the method of JIS Z0208:1976 is 50 g/m²·24 h or lower.

[4] The container according to any one of aspects 1 to 3, which comprises an external body composed of the high-lignin-content member and an internal body composed of the low-lignin-content member.

[5] The container according to any one of aspects 1 to 4, wherein:
  the external body is a box or bag, and
  the internal body is a sheet that is either anchored or not anchored to the external body.

[6] The container according to any one of aspects 1 to 5, wherein the yellowness index (YI) of the high-lignin-content member is 20 or greater.

[7] The container according to any one of aspects 1 to 6, wherein the high-lignin-content member is a paper material obtained from unbleached pulp and/or waste paper.

[8] The container according to any one of aspects 1 to 7, wherein the low-lignin-content member includes a polyolefin.

[9] A package comprising a container and a cellulose resin composition that includes a thermoplastic resin and cellulose, housed in the container, wherein:
  the container comprises a high-lignin-content member with a lignin content of 10 mass % or greater and a low-lignin-content member with a lignin content of 1 mass % or lower, and
  the whole of the surface of the container to be in contact with the cellulose resin composition is composed of the low-lignin-content member.

[10] The package according to aspect 9, wherein the lignin content of the cellulose is 20 mass % or lower.

[11] The package according to aspect 10, wherein:
  the lignin content (Lo) of the high-lignin-content member, the lignin content (Li) of the low-lignin-content member and the lignin content (Lc) of the cellulose satisfy the relationship represented by the following formula:

$$Lo > Lc \geq Li.$$

[12] The package according to any one of aspects 9 to 11, wherein the water vapor permeability of the low-lignincontent member as measured by the method of JIS Z0208: 1976 is 50 g/m²·24 h or lower.

[13] The package according to any one of aspects 9 to 12, which comprises an external body composed of the high-lignin-content member and an internal body composed of the low-lignin-content member.

[14] The package according to any one of aspects 9 to 13, wherein:
the external body is a box or bag, and
the internal body is a sheet that is either anchored or not anchored to the external body.

[15] The package according to any one of aspects 9 to 14, wherein the yellowness index (YI) of the high-lignin-content member is 20 or greater.

[16] The package according to any one of aspects 9 to 15, wherein the high-lignin-content member is a paper material obtained from unbleached pulp and/or waste paper.

[17] The package according to any one of aspects 9 to 16, wherein the cellulose is cellulose nanofibers.

[18] The package according to any one of aspects 9 to 17, wherein the cellulose resin composition is in the form of pellets.

[19] The package according to any one of aspects 9 to 18, wherein 0.01 kg to 550 kg of the cellulose resin composition is housed in the container.

[20] The package according to any one of aspects 9 to 19, wherein the water absorption percentage of the cellulose resin composition as measured by the method of JIS K0113: 2005 is 1000 ppm by mass or lower.

[21] The package according to any one of aspects 9 to 20, wherein when the package is subjected to high-temperature, high-humidity treatment for 720 hours in air at ordinary pressure at a temperature of 60° C. and a relative humidity of 75%, the difference between the yellowness index (YI) before high-temperature, high-humidity treatment and the yellowness index (YI) after high-temperature, high-humidity treatment of the cellulose resin composition is 20 or less.

[22] A method for inhibiting discoloration of a cellulose resin composition that includes a thermoplastic resin and cellulose during its storage,
which includes housing the cellulose resin composition in the container,
wherein:
the container comprises a high-lignin-content member with a lignin content of 10 mass % or greater and a low-lignin-content member with a lignin content of 1 mass % or lower, and
the whole of the surface of the container to be in contact with the cellulose resin composition is constituted of the low-lignin-content member.

[23] A method for producing a molded article that includes a cellulose resin composition comprising a thermoplastic resin and cellulose, wherein the method comprises:
a step of preparing the cellulose resin composition housed in a container, and
a step of injection molding the cellulose resin composition housed in the container into a mold,
wherein:
the container comprises a high-lignin-content member with a lignin content of 10 mass % or greater and a low-lignin-content member with a lignin content of 1 mass % or lower,
the whole of the surface of the container to be in contact with the cellulose resin composition is constituted of the low-lignin-content member, and
the YI of the molded article is 50 or lower.

Advantageous Effects of Invention

According to the invention it is possible to provide a container that can store a cellulose resin composition without discoloration occurring with time, a package comprising the container and a cellulose resin composition, a method for inhibiting discoloration of a cellulose resin composition using the container, and a method for producing a molded resin that includes using the container.

DESCRIPTION OF EMBODIMENTS

Exemplary modes of the present invention will now be described, with the understanding that they are not limitative on the invention.

<Container>

One aspect of the invention provides a container for containing a cellulose resin composition comprising a thermoplastic resin and cellulose. According to one aspect, the container includes a high-lignin-content member with a lignin content of 10 mass % or greater and a low-lignin-content member with a lignin content of 1 mass % or lower. According to one aspect, the whole of the inner surface, as the surface of the container to be in contact with the cellulose resin composition (more specifically, at least 99 area % and especially 100 area %) is constituted of the low-lignin-content member. The phrase "the whole of the inner surface" does not exclude cases where parts of the inner surface exist that are not constituted of the low-lignin-content member, within a range that does not interfere with the effect of the invention (for example, it does not exclude cases where sections exist in which the low-lignin-content member is not exposed on the inner surface due to defects such as gouging or fraying, or seams).

The present inventors have found that, while discoloration during storage in a container is remarkable with a cellulose-containing resin composition compared to a non-cellulose-containing resin composition, the discoloration is significantly inhibited if the lignin content of the container is reduced. While the details are not fully understood, it is thought that some chemical interaction between lignin and the resin composition due to the chemical structure (for example, the phenolic hydroxyl groups) of lignin (for example, formation of coloring components (such as nitrophenol) when the phenolic hydroxyl groups in lignin react with nitrogen-containing compounds in the cellulose resin composition) produces discoloration of the cellulose resin composition, and that this interaction can be inhibited by reducing the amount of lignin, thereby inhibiting discoloration. Since discoloration due to lignin in the container is a phenomenon uniquely seen with cellulose resin compositions, the container of the present disclosure is especially suitable for the specific use of housing a cellulose resin composition.

The lignin content of the high-lignin-content member is 10 mass % or greater, and according to one aspect it may be 15 mass % or greater, 20 mass % or greater or 25 mass % or greater. According to one aspect the lignin content of the high-lignin-content member may also be 70 mass % or lower, 50 mass % or lower or 35 mass % or lower. The lignin content of the disclosure is the value measured by the Klason lignin method.

The high-lignin-content members include paper materials comprising unbleached pulp and/or waste paper (more typically paper materials obtained from unbleached pulp and/or waste paper) or the like. Unbleached pulp and waste paper are advantageous because of their low cost.

According to a typical aspect, the high-lignin-content member has a relatively high yellowness index (YI). According to one aspect, the YI value of the high-lignin-content member may be 20 or greater, 50 or greater or 70 or greater, and according to one aspect it may be 120 or lower, 110 or lower or 100 or lower. For the purpose of the disclosure, the yellowness index (YI) is the value measured according to JIS K7373.

The lignin content of the low-lignin-content member is 1 mass % or lower. A lower lignin content is preferred, with 0 mass % being even more preferred.

Low-lignin-content members include polymers of a polyolefin (such as polyethylene or polypropylene), and metals such as aluminum. From the viewpoint of more satisfactorily inhibiting water absorption by the cellulose resin composition, the low-lignin-content member preferably includes a polyolefin and/or a metal (preferably aluminum), and more preferably it is composed of a polyolefin and/or a metal (most preferably aluminum). A polyolefin is also advantageous because of its low cost.

According to one aspect, the low-lignin-content member has relatively low water vapor permeability. If the low-lignin-content member has a low lignin content and also low water vapor permeability, then it will be possible to inhibit water absorption in addition to inhibiting discoloration of the cellulose resin composition. Because water absorption leads to deterioration due to hydrolysis of the components in the cellulose resin composition, it is preferable to inhibit water absorption. According to one aspect, the water vapor permeability of the low-lignin-content member, as measured by the method of JIS Z0208:1976, is 50 g/m$^2$·24 h or lower, 20 g/m$^2$·24 h or lower or 10 g/m$^2$·24 h or lower. While a lower water vapor permeability is preferred, it may be 1 g/m$^2$·24 h or greater, 5 g/m$^2$·24 h or greater or 10 g/m$^2$·24 h or greater from the viewpoint of facilitating production of the container.

According to one aspect, the container may be composed essentially of a high-lignin-content member and low-lignin-content member, and according to one aspect it may comprise the high-lignin-content member and low-lignin-content member with additional materials. The additional materials include all materials that are not encompassed by the terms "high-lignin-content member" and "low-lignin-content member" of the disclosure. Additional materials include adhesives, for example.

From the viewpoint of cost reduction for the container by using the high-lignin-content member, the mass ratio of the high-lignin-content member with respect to the total container may be 10 mass % or greater, 30 mass % or greater or 50 mass % or greater, for example, while from the viewpoint of obtaining a satisfactory advantage by using the low-lignin-content member, it may be 99.9 mass % or lower, 99 mass % or lower or 90 mass % or lower, for example.

From the viewpoint of obtaining a satisfactory advantage by using the low-lignin-content member, the mass ratio of the low-lignin-content member with respect to the total container may be 0.1 mass % or greater, 1 mass % or greater or 10 mass % or greater, for example, while from the viewpoint of cost reduction for the container by using the high-lignin-content member, it may be 90 mass % or lower, 70 mass % or lower or 50 mass % or lower, for example.

The mass ratio of additional materials with respect to the total container may be selected as appropriate depending on the purpose for which the additional materials are used, and it may be 0.01 mass % to 90 mass %, 0.1 mass % to 50 mass % or 1 mass % to 30 mass %, for example.

The container according to one aspect comprises an external body composed of the high-lignin-content member and an internal body composed of the low-lignin-content member. According to a typical aspect, at least most of the inner surface of the container (that is, the surface of the container to be in contact with the cellulose resin composition) is composed of the internal body. According to one typical aspect, the external body forms the outer surface of the container, but a material that is not the high-lignin-content member (for example, a coating layer) may also be disposed on the surface of the external body so that the high-lignin-content member is not exposed at the outer surface of the container. According to one aspect, a different material may be disposed between the external body and the internal body. According to one aspect, both the external body and internal body may each be a laminated body having multiple layers, in which case separate materials may also be disposed between the layers.

Examples for the combination of the external body and internal body include a combination in which the external body is a box or bag and the internal body is a sheet that is either anchored or not anchored to the external body. A container in which the internal body is not anchored to the external body may be a container in which the external body is a box or bag and the internal body is a box or bag situated inside the external body. One example of such a container is a container in which the external body is a box or bag composed of a paper material (preferably a paper material obtained from unbleached pulp and/or waste paper) and the internal body is a bag that includes a polyolefin. A container where the internal body is anchored to the external body may be a container in which, where the internal body is not anchored to the external body, at least part of the internal body and at least part of the external body of the container are anchored using an adhesive, or a coated or laminated container in which the external body is a bag and the internal body is laminated on the inner surface of the bag either directly or via an adhesive.

From the viewpoint of satisfactory mechanical strength for housing a cellulose resin composition, and from the viewpoint of satisfactorily inhibiting water absorption by the cellulose resin composition, the thickness of the external body may be 0.01 mm or greater, 0.1 mm or greater or 1 mm or greater, while from the viewpoint of handleability and cost it may be 20 mm or lower, 10 mm or lower or 5 mm or lower.

From the viewpoint of satisfactory mechanical strength for housing a cellulose resin composition, and from the viewpoint of satisfactorily inhibiting discoloration and water absorption by the cellulose resin composition, the thickness of the internal body may be 0.001 mm or greater, 0.01 mm or greater or 0.1 mm or greater, while from the viewpoint of handleability and cost it may be 5 mm or lower, 3 mm or lower or 1 mm or lower.

The shape and dimensions of the container (the external body and internal body according to one aspect) are not limited and may be selected as appropriate for the purpose. For example, a box may be a rectangular solid or cube, or any of various modified shapes. When the cellulose resin composition is a molded product, for example, the box may have a shape modified to the shape of the molded product. Similarly, a bag may have a rectangular or square shape (or the same shapes with thickness), or any of various modified forms. According to one aspect, the dimensions for a box may be: maximum length of 50 mm to 2000 mm×maximum width of 50 mm to 2000 mm×maximum height of 50 mm to 2000 mm. According to one aspect, the dimensions for a bag may be: maximum length of 50 mm to 2000 mm×maximum width of 50 mm to 2000 mm×maximum thickness of 50 mm to 2000 mm.

<Package>

One aspect of the invention provides a package comprising a container and a cellulose resin composition that includes a thermoplastic resin and cellulose housed in the container.

The container of the package of the disclosure may be the container of the disclosure described above. The container therefore includes a high-lignin-content member with a lignin content of 10 mass % or greater and a low-lignin-content member with a lignin content of 1 mass % or lower. The preferred aspect for the container of the package may be the same as described above under <Container>.

The cellulose resin composition includes a thermoplastic resin and cellulose, and according to one aspect it further includes optional additional components.

<Thermoplastic Resin>

Various types of resins may be used as the thermoplastic resin. According to one aspect, the thermoplastic resin has a number-average molecular weight of 5000 or greater. The number-average molecular weight for the purpose of the present disclosure is the value measured in terms of standard polymethyl methacrylate, using GPC (gel permeation chromatography). The thermoplastic resin may be a crystalline resin with a melting point in the range of 100° C. to 350° C., or an amorphous resin with a glass transition temperature in the range of 100 to 250° C. The thermoplastic resin may be constructed of one or more polymers, which may be homopolymers or copolymers.

The thermoplastic resin may be a polyamide-based resin, polyester-based resin, polyacetal-based resin, polycarbonate-based resin, polyacrylic-based resin, polyphenylene ether-based resin (including modified polyphenylene ethers modified by blending or graft polymerization of polyphenylene ether with other resins), polyallylate-based resin, polysulfone-based resin, polyphenylene sulfide-based resin, polyethersulfone-based resin, polyketone-based resin, polyphenylene ether ketone-based resin, polyimide-based resin, polyamideimide-based resin, polyetherimide-based resin, polyurethane-based resin or polyolefin-based resin (such as an α-olefin (co)polymer), or any of various ionomers.

Specific examples that are preferred for the thermoplastic resin include high-density polyethylene, low-density polyethylene (such as linear low-density polyethylene), polypropylene, polymethylpentene, cyclic olefin-based resins, poly 1-butene, poly 1-pentene, polymethylpentene, ethylene/α-olefin copolymer, ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene terpolymer), ionomers, α-olefin copolymers, modified IR (isoprene rubber), modified SEBS (styrene-ethylene-butylene-styrene copolymer), isobutylene-paramethylstyrene halide copolymer, ethylene-acrylic acid-modified polymer, ethylene-vinyl acetate copolymer and its acid-modified forms, copolymers of (ethylene and/or propylene) and (unsaturated carboxylic acids and/or unsaturated carboxylic acid esters), polyolefins obtained by forming metal salts with at least some of the carboxyl groups of copolymers of (ethylene and/or propylene) and (unsaturated carboxylic acids and/or unsaturated carboxylic acid esters), block copolymers of conjugated dienes and vinyl aromatic hydrocarbons, hydrogenated forms of block copolymers of conjugated dienes and vinyl aromatic hydrocarbons, copolymers of other conjugated diene compounds with nonconjugated olefins, natural rubber, various butadiene rubbers, various styrene-butadiene copolymer rubbers, isoprene rubber, butyl rubber, bromides of isobutylene and p-methylstyrene copolymers, butyl halide rubber, acrylonitrilobutadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluorine rubber, urethane rubber, polyvinyl chloride, polystyrene, acrylic polymers such as polyacrylic acid esters and polymethacrylic acid esters, acrylonitrile-based copolymers composed mainly of acrylonitrile, acrylonitrile-butadiene-styrene (ABS) resins, acrylonitrile-styrene (AS) resins, cellulosic resins such as cellulose acetate, and saponification products of vinyl chloride/ethylene copolymer, vinyl chloride/vinyl acetate copolymer, ethylene/vinyl acetate copolymer and ethylene/vinyl acetate copolymer.

These may be used alone or in combinations of two or more. When two or more are used in combination, they may be used as a polymer alloy. The thermoplastic resin used may be modified with one or more compounds selected from among unsaturated carboxylic acids and their acid anhydrides or derivatives.

From the viewpoint of heat resistance, moldability, design properties and mechanical properties, it is preferred to select one or more resins from the group consisting of polyolefin-based resins, polyamide-based resins, polyester-based resins, polyacetal-based resins, polyacrylic-based resins, polyphenylene ether-based resins and polyphenylene sulfide-based resins. For example, a polyamide-based resin is more prone to discoloration and moisture absorption by the phenolic hydroxyl groups. The container according to one aspect of the invention is particularly advantageous for housing of a cellulose resin composition comprising such a polyamide-based resin.

The polyolefin-based resin is a polymer obtained by polymerizing a monomer unit that includes an olefin (such as an α-olefin). Specific examples of polyolefin-based resins include, but are not limited to, ethylene-based (co)polymers such as low-density polyethylene (for example, linear low-density polyethylene), high-density polyethylene, ultralow-density polyethylene and ultrahigh molecular weight polyethylene, polypropylene-based (co)polymers such as polypropylene, ethylene-propylene copolymer and ethylene-propylene-diene copolymer, and copolymers of α-olefins such as ethylene with other monomer units, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of 3 g/10 min to 60 g/10 min, as measured at 230° C. with a load of 21.2 N, according to ISO1133. The lower limit for MFR is more preferably 5 g/10 min, even more preferably 6 g/10 min and most preferably 8 g/10 min. The upper limit for MFR is more preferably 25 g/10 min, even more preferably 20 g/10 min and most preferably 18 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose.

Examples of preferred polyamide-based resins for the thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,1, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 µmol/g and more preferably 30 µmol/g. The upper limit for the terminal carboxyl group concentration is preferably 150 µmol/g, more preferably 100 µmol/g and even more preferably 80 µmol/g.

In the polyamide-based resin, the ratio of carboxy-terminal groups with respect to the total terminal groups ([COOH]/[total terminal groups]) is more preferably 0.30 to 0.95. The lower limit for the carboxy-terminal group ratio is more preferably 0.35, yet more preferably 0.40 and most preferably 0.45. The upper limit for the carboxy-terminal group ratio is more preferably 0.90, even more preferably 0.85 and most preferably 0.80. The carboxy-terminal group ratio is preferably 0.30 or greater from the viewpoint of dispersibility of the cellulose in the resin composition, and it is preferably no greater than 0.95 from the viewpoint of the color tone of the obtained resin composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from the group consisting of acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decylamine, stearylamine, cyclohexylamine and aniline.

The concentration of the amino terminal groups and carboxy-terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by $^1$H-NMR.

Preferred polyester-based resins for the thermoplastic resin are not particularly restricted but include one or more from among polyethylene terephthalate (PET), polybutylene terephthalate (PBT), polyethylene naphthalate (PEN), polybutylene succinate (PBS), polybutylene succinate adipate (PBSA), polybutylene adipate terephthalate (PBAT), polyallylate (PAR), polyhydroxyalkanoic acids (PHA) (polyester resins composed of 3-hydroxyalkanoic acids), polylactic acid (PLA) and polycarbonate (PC). Preferred polyester-based resins among these include PET, PBS, PBSA, PBT and PEN, with PBS, PBSA and PBT being more preferred.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working.

<Cellulose>

The type of cellulose may be selected depending on the properties desired for the cellulose resin composition, and cellulose fibers, for example, are preferred for use. According to one aspect, the lignin content of the cellulose is 20 mass % or lower. A lower lignin content is preferred, and 0 mass % (i.e. no lignin present) is most preferred. For example, a lignin content of 0 mass % can be obtained by using a lignin-free starting material such as cotton linter. A cellulose resin composition wherein the lignin content of the cellulose is 20 mass % or lower results in a more notable effect of preventing discoloration by using the container of the disclosure.

According to one aspect, the lignin content (Lc) of the cellulose is 20 mass % or lower, and the lignin content (Lo) of the high-lignin-content member, the lignin content (Li) of the low-lignin-content member and the lignin content (Lc) of the cellulose satisfy the relationship represented by the following formula:

$$Lo > Lc \geq Li.$$

If the high-lignin-content member, low-lignin-content member and cellulose lignin content satisfy this relationship, then the effect of preventing discoloration by using the container of the disclosure will be more notable.

According to one aspect, the cellulose is cellulose nanofibers (that is, cellulose fibers with a mean fiber size of 1000 nm or smaller). Preferred examples of cellulose nanofibers include, but are not limited to, one or more types from among cellulose nanofibers obtained using cellulose pulp starting materials, and modified forms of such cellulose. From the viewpoint of stability and performance, it is preferable to use one or more types of modified cellulose. The mean fiber size of the cellulose nanofibers is 1000 nm or smaller, preferably 500 nm or smaller and more preferably 200 nm or smaller, from the viewpoint of obtaining satisfactory mechanical strength (especially tensile modulus) for the molded resin. While a smaller mean fiber size is preferred, it is preferably 10 nm or greater, more preferably 20 nm or greater and even more preferably 30 nm or greater from the viewpoint of easier processing. The mean fiber size is the value determined to be the equivalent spherical diameter (volume-average particle diameter) of the particles at a cumulative volume of 50% using a laser diffraction/scattering method-based particle size distribution meter.

The mean fiber size can be measured by the following method. The cellulose nanofibers at a solid content of 40 mass % are kneaded for 30 minutes in a planetary mixer (for example, a 5DM-03-R by Shinagawa Machinery Works Co., Ltd., hook-type stirring blade) at 126 rpm, room temperature and ordinary pressure, and then a purified water suspension is prepared to 0.5 mass %, a high-shear homogenizer (for example, an "Excel ED-7 Autohomogenizer", trade name of Nippon Seiki Co., Ltd., processing conditions) is used for dispersion at rotational speed: 15,000 rpm×5 minutes, a centrifugal separator (for example, a "Model 6800 Centrifugal Separator", trade name of Kubota Corp., Rotor type Model RA-400) is used for centrifugation under conditions with a centrifugal force of 39,200 m²/s for 10 minutes, producing a supernatant, and the supernatant is centrifuged at 116,000 m²/s for 45 minutes, producing a centrifugation supernatant. The supernatant liquid is used to measure the 50% cumulative particle diameter, as the volume-average particle diameter (specifically, the equivalent spherical diameter of particles at a cumulative volume of 50% with respect to the total volume of the particles), in the volume frequency particle size distribution obtained using a laser diffraction/scattering method-based particle size distribution meter (for example, an "LA-910" or "LA-950", trade names of Horiba, Ltd., with ultrasonic treatment for 1 minute, refractive index: 1.20).

According to a typical aspect, the L/D ratio of the cellulose nanofibers is 20 or greater. The lower limit for L/D of the cellulose nanofibers is preferably 30, more preferably 40, even more preferably 50 and yet more preferably 100. The upper limit is not particularly restricted but is preferably 10,000 or lower from the viewpoint of handleability. The L/D ratio of the cellulose nanofibers is preferably within this range to exhibit satisfactory mechanical properties for the resin composition of this disclosure using a small amount of cellulose nanofibers.

For the present disclosure, the length (L), diameter (D) and L/D ratio of the cellulose nanofibers are determined by preparing aqueous dispersions of the cellulose nanofibers, each aqueous dispersion being dispersed using a high-shear homogenizer (for example, an "Excel ED-7 Autohomogenizer", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using each air-dried product as a measuring sample for measurement with an optical microscope or a high-resolution scanning microscope (SEM) or atomic force microscope (AFM). Specifically, the length (L) and diameter (D) of 100 randomly selected cellulose nanofibers are measured in an observation field with the magnification adjusted so as to observe at least 100 cellulose nanofibers, and the ratio (L/D) is calculated. The lengths and diameters of the cellulose nanofibers of the present disclosure are the number-average values for the 100 cellulose fibers.

The cellulose nanofibers may be cellulose obtained by treating pulp or the like with hot water or the like at 100° C. or higher, hydrolyzing the hemicellulose portion to weaken it, and then defibrating by a pulverizing method using a high-pressure homogenizer, microfluidizer, ball mill or disk mill.

According to one aspect, the cellulose nanofibers may be modified (i.e. modified cellulose nanofibers). The modified cellulose nanofibers may have the cellulose modified with one or more modifying agents selected from among esterifying agents, silylating agents, isocyanate compounds, halogenated alkylating agents, alkylene oxides and/or glycidyl compounds.

<Additional Components>

The cellulose resin composition may optionally include additional components in addition to the thermoplastic resin and cellulose. Such additional components include surface treatment agents, antioxidants, inorganic fillers and lubricant oils. Each of the components may be used alone, or in combinations of two or more. They may also be either commercially available reagents or products.

Preferred examples for the surface treatment agent include compounds having a hydrophilic segment and a hydrophobic segment in the molecule, and more specifically copolymers obtained using one or more from among compounds that provide hydrophilic segments (for example, polyethylene glycol) and compounds that provide hydrophobic segments (for example, polypropylene glycol, poly(tetramethylene ether)glycol (PTMEG) and polybutadienediol) (for example, block copolymers of propylene oxide and ethylene oxide or block copolymers of tetrahydrofuran and ethylene oxide).

From the viewpoint of increasing the dispersibility of cellulose in the cellulose resin composition, the preferred content of the surface treatment agent in the cellulose resin composition is 0.1 mass % or greater, 0.2 mass % or greater or 0.5 mass % or greater, while from the viewpoint of inhibiting plasticization of the cellulose resin composition and maintaining satisfactory strength, it is preferably 50 mass % or lower, 30 mass % or greater, 20 mass % or greater, 18 mass % or greater, 15 mass % or greater, 10 mass % or greater or 5 mass % or greater.

From the viewpoint of increasing the dispersibility of the cellulose in the cellulose resin composition, the amount of the surface treatment agent with respect to 100 parts by mass of the cellulose is preferably 0.1 parts by mass or greater, 0.5 parts by mass or greater or 1 parts by mass or greater, while from the viewpoint of inhibiting plasticization of the cellulose resin composition and maintaining satisfactory strength it is preferably 100 parts by mass or lower, 99 parts by mass or lower, 90 parts by mass or lower, 80 parts by mass or lower, 70 parts by mass or lower, 50 parts by mass or lower or 40 parts by mass or lower.

From the viewpoint of an effect of preventing heat-induced deterioration, the antioxidant is preferably a hindered phenol-based antioxidant, sulfur-based antioxidant or phosphorus-based antioxidant, more preferably a phosphorus-based antioxidant or hindered phenol-based antioxidant, and even more preferably a combination of a phosphorus-based antioxidant and/or hindered phenol-based antioxidant with a hindered amine-based light stabilizer (HALS).

The amount of antioxidant with respect to the total cellulose resin composition is preferably 0.01 mass % or greater, 0.02 mass % or greater, 0.03 mass % or greater or 0.05 mass % or greater, and preferably 5 mass % or lower, 4 mass % or lower, 3 mass % or lower, 2 mass % or lower or 1 mass % or lower.

The inorganic filler may be filamentous particles, plate-shaped particles or an inorganic pigment. Filamentous particles and plate-shaped particles may have a mean aspect ratio of 5 or greater. From the viewpoint of increasing the handleability during molding from the cellulose resin composition into a molded resin, the amount of inorganic filler in the cellulose resin composition is preferably 0.002 parts by mass to 50 parts by mass with respect to 100 parts by mass of the thermoplastic resin.

The lubricant oil may be a natural oil (engine oil, cylinder oil or the like), a synthetic hydrocarbon (paraffinic oil, naphthene-based oil, aroma oil or the like), or a silicone-based oil. The molecular weight of the lubricant oil may be 100 or greater, 400 or greater or 500 or greater, for example, and 5,000,000 or lower, 2,000,000 or lower or 1,000,000 or lower, for example.

The melting point of the lubricant oil may be −50° C. or higher, −30° C. or higher or −20° C. or higher, for example, and 50° C. or lower, 30° C. or lower or 20° C. or lower, for example. The melting point is a temperature 2.5° C. lower than the pour point of the lubricant oil, which can be measured according to JIS K2269.

From the viewpoint of increasing the abrasion resistance, the content of the lubricant oil with respect to 100 parts by mass of the thermoplastic resin is preferably 0.1 parts by mass or greater, 0.2 parts by mass or greater or 0.3 parts by mass or greater, while from the viewpoint of avoiding unwanted softening of the cellulose resin composition, it is preferably 5.0 parts by mass or lower, 4.5 parts by mass or lower or 4.2 parts by mass or lower.

The total amount of additional components in the cellulose resin composition may be 0 mass % or greater, 1 mass % or greater, or 10 mass % or greater, for example, and 70 mass % or lower, 50 mass % or lower or 30 mass % or lower, for example.

According to a preferred aspect, the cellulose resin composition includes 30 mass % to 99 mass % of the thermoplastic resin, 1 mass % to 60 mass % of the cellulose and 0 mass % to 69 mass % of additional components. According to another preferred aspect, the cellulose resin composition includes 50 mass % to 97 mass % of the thermoplastic resin, 3 mass % to 20 mass % of the cellulose and 0 mass % to 47 mass % of additional components, or 65 mass % to 95 mass % of the thermoplastic resin, 5 mass % to 15 mass % of the cellulose and 0 mass % to 20 mass % of additional components.

There are no particular restrictions on the form of the cellulose resin composition, which may be a processing material (pellets or powder) or a molded product. The molded product may be any of a wide range of products, such as an electronic device part, vehicle part, construction material or daily household item.

The amount of cellulose resin composition to be housed in the container may be 0.01 kg or greater, 1 kg or greater or 20 kg or greater, according to one aspect, and 550 kg or lower, 100 kg or lower or 30 kg or lower, according to one aspect.

According to one aspect, the water absorption percentage of the cellulose resin composition, as measured by the method of JIS K0113:2005 (Karl Fischer method), may be 1000 ppm by mass or lower, 900 ppm by mass or lower or 800 ppm by mass or lower. Using a container comprising a combination of a high-lignin-content member and a low-lignin-content member in the package of the embodiment provides the advantage of lowering the water absorption percentage of the cellulose resin composition. The water absorption percentage of the cellulose resin composition is preferably lower from the viewpoint of satisfactorily maintaining the quality of the cellulose resin composition, but according to one aspect from the viewpoint of easier production of the package, it may be 10 ppm by mass or greater, 100 ppm by mass or greater or 500 ppm by mass or greater.

When the package is subjected to high-temperature, high-humidity treatment for 720 hours (30 days) in air at ordinary pressure at a temperature of 60° C. and a relative humidity of 75%, the difference between the yellowness index (YI) before high-temperature, high-humidity treatment and the yellowness index (YI) after high-temperature, high-humidity treatment of the cellulose resin composition (hereunder also referred to as "YI difference") may be 25 or less, 20 or less or 16 or less. A smaller YI difference satisfactorily inhibits discoloration of the cellulose resin composition. The YI difference is preferably lower from the viewpoint of satisfactorily maintaining the quality of the cellulose resin composition, but according to one aspect, from the viewpoint of easier production of the package, it may be 1 or greater, 10 or greater or 20 or greater.

<Method for Inhibiting Discoloration of Cellulose Resin Composition>

One aspect of the invention provides a method for inhibiting discoloration of a cellulose resin composition that includes a thermoplastic resin and cellulose, during its storage while the cellulose resin composition is housed in a container. The container used in the method may be the container of the disclosure as described above. The container therefore includes a high-lignin-content member with a lignin content of 10 mass % or greater and a low-lignin-content member with a lignin content of 1 mass % or lower. The preferred aspect for the container to be used in the method may be the same as described above under <Container>.

<Method for Producing Molded Article>

One aspect of the invention provides a method for producing a molded article comprising a cellulose resin composition that includes a thermoplastic resin and cellulose, wherein the method includes a step of preparing a cellulose resin composition housed in a container, and a step of injection molding the cellulose resin composition housed in the container into a mold. The container used in the method may be the container of the disclosure as described above.

The container therefore includes a high-lignin-content member with a lignin content of 10 mass % or greater and a low-lignin-content member with a lignin content of 1 mass % or lower. The preferred aspect for the container to be used in the method may be the same as described above under <Container>.

Using the method for producing a molded article described above it is possible to obtain a molded article with low discoloration. According to one aspect, the YI value of the molded article obtained by the method for producing a molded article may be 50 or lower, 40 or lower, 30 or lower or 25 or lower. The YI value of the molded article is preferably smaller from the viewpoint of obtaining satisfactory quality for the molded article, while according to one aspect from the viewpoint of easier production of the molded article, it may be one or greater, 5 or greater or 10 or greater.

EXAMPLES

Exemplary modes of the invention will now be further illustrated using Examples, with the understanding that the invention is not limited to these Examples.
[Evaluation of Properties]
The properties were evaluated by the following methods.
<Measurement of Terminal Amino Group Concentration [NH$_2$] of Polyamide>
The value was calculated from potentiometric titration of a weighed sample dissolved in a 90 mass % aqueous phenol solution, using 1/50 N hydrochloric acid at 25° C.
<Measurement of Terminal Carboxyl Group Concentration [COOH] of Polyamide>
The value was calculated from potentiometric titration of a weighed sample dissolved in a benzyl alcohol at 160° C., using 1/50 N hydrochloric acid at 25° C. as the indicator.
<Cellulose Polymerization Degree>
This was measured by a reduced relative viscosity method using a copper-ethylenediamine solution, as specified in Crystalline Cellulose Verification Test (3) of "Japanese Pharmacopeia, 14th Edition (Hirokawa Shoten)".
<Crystalline Form and Degree of Crystallinity of Cellulose>
An X-ray diffraction device (Multipurpose X-ray diffraction device by Rigaku Corp.) was used to measure the diffraction image by a powder method (ordinary temperature), and the degree of crystallinity was calculated by the Segal method. The crystalline form was also measured from the obtained X-ray diffraction image.
<Mean Fiber Size and Mean L/D of Cellulose>
A purified water suspension of the cellulose at 1 mass % concentration was prepared and dispersed with a high-shear homogenizer (for example, an "Excel ED-7 Autohomogenizer", trade name of Nippon Seiki Co., Ltd., processing conditions: rotational speed=15,000 rpm×5 minutes) to produce an aqueous dispersion which was diluted with purified water to 0.1 to 0.5 mass %, and this was cast onto mica and air-dried, and measured with an atomic force microscope (AFM). The measurement was carried out with adjustment of the magnification so that at least 100 cellulose fibers were observable, the long diameters (L) and short diameters (D) of 100 randomly selected cellulose fibers, and their ratios (L/D) were determined, and the addition average for the 100 cellulose fibers was calculated.
<Lignin Content>
This was measured by the Klason method, using the following procedure.
The dispersing medium was removed from the cellulose dispersion, or a re-dispersion of the cellulose obtained by dissolving and removing the resin from the cellulose resin composition, the cellulose residue was recovered, and the mass of the dry sample obtained by drying at 105° C. was measured. The dried cellulose residue was pulverized, and the pulverized sample was extracted for 6 hours with an alcohol (ethanol)/benzene mixed solvent using a Soxhlet extractor, and then further for 4 hours with alcohol to obtain a degreased sample.

After adding 3 mL of 72 mass % sulfuric acid to 300 mg of the degreased sample, the mixture was allowed to stand for 1 hour at 30° C. and then poured into a pressure-resistant bottle (125 mL volume) with 84 mL of distilled water. Autoclave treatment was carried out for 1 hour at 120° C., and before cooling, the mixture was filtered with a glass filter to filter out the acid-insoluble lignin, while also collecting the filtrate. The acid-insoluble lignin was rinsed with distilled water and dried at 105° C., after which the mass of the acid-insoluble lignin fraction was measured and the absorbance of the filtrate was measured with an ultraviolet and visible spectrophotometer.

The acid-insoluble lignin and acid-soluble lignin contents were calculated using the following formulas. These were totaled to determine the total lignin content.

$$\text{Acid-insoluble lignin (\%)} = \text{Acid-insoluble lignin fraction (g)/sample amount (anhydrous base) (g)} \times 100$$

$$\text{Acid-soluble lignin (\%)} = ((d \times v \times (As-Ab))/(a \times w)) \times 100$$

$$\text{Lignin (\%)} = \text{Acid-insoluble lignin (\%)} + \text{acid-soluble lignin (\%)}$$

d: Dilution factor
v: Filtrate constant volume (L)
As: Sample solution absorbance
Ab: Blank solution absorbance
a: Lignin absorption coefficient (110 L/g·cm)
w: Sample amount (anhydrous base) (g)
<Water Vapor Permeability of Internal Body>
This was measured according to JIS Z0208:1976.
<Water Absorption Percentage of Cellulose Resin Composition or Comparison Resin Composition>
This was measured according to JIS K0113:2005. The water absorption percentage of the cellulose resin composition or a comparison resin composition in the package was measured both immediately after fabricating the package (initial), and after storage for 24 hours under conditions with a temperature of 23° C. and a relative humidity of 50%.
<Yellowness index (YI)>
This was measured according to JIS K7373. For the YI of the cellulose resin composition or the comparison resin composition, the YI value of the cellulose resin composition or comparison resin composition in the package was measured both immediately after fabricating the package (initial), and after aging for 720 hours under high-temperature, high-humidity conditions with a temperature of 60° C. and a relative humidity of 75%, and the difference in the initial and post-aging YI values was recorded as ΔYI.
<Odor and Moldability During Molding>
Packages of a cellulose resin composition or comparison resin composition obtained in the Examples and Comparative Examples were opened after aging for 720 hours under high-temperature, high-humidity conditions with a temperature of 60° C. and a relative humidity of 75%, and pellets were obtained. The cylinder temperature of an injection molding machine with a maximum clamping pressure of 4000 tons was set to 250° C. for a polyamide resin composition and to 200° C. for a polypropylene resin, and the pellets were used for 10 purge operations followed by molding, and evaluation of the odor on the following 3-level scale.

Good: Notable sweet odor around the molding machine

Acceptable: Notable burnt odor around the molding machine

Poor: Notable burnt odor throughout entire indoor area

A molding experiment was also conducted in the same manner and the moldability was evaluated on the following 3-level scale.

Good: No significant problems in molding

Acceptable: Defects such as silver or voids generated

Poor: Molding not possible due to defective measurement

<Materials Used>

[Cellulose Resin Composition]

(Thermoplastic Resin)

Polyamide 6: "1013B" (carboxy-terminal ratio [COOH]/[total terminal groups]=0.65), by Ube Industries, Ltd.

Polypropylene: "J704LB" by Prime Polymer Co., Ltd.

(Cellulose)

Cellulose 1 was prepared by the following procedure.

After cutting filter paper, an autoclave was used to heat it for 3 hours in hot water at 120° C. or higher to remove the hemicellulose portion and obtain refined pulp, which was pressed and beaten into highly chopped fibers and fibrils to a solid content of 1.5 mass % in purified water, and then defibrated with a high-pressure homogenizer (10 times at an operating pressure of 85 MPa) at the same concentration to obtain defibrated cellulose. For the beating treatment, a disc refiner was used for 4 hours of treatment with a high-cutting beating blade (hereunder referred to as "cutting blade"), and then a high-defibrating beating blade (hereunder referred to as "defibrating blade") was used for another 1.5 hours of beating to obtain cellulose 1. The properties of the obtained cellulose 1 were evaluated by the methods described above. The results are shown below.

Mean L/D=300

Mean fiber size=90 nm

Degree of crystallinity=80%

Degree of polymerization=600

Cellulose 2 is a mixture of cellulose 1 with cellulose 4 described below at cellulose 1:cellulose 4 (mass ratio)=65:35.

Cellulose 3 is a mixture of cellulose 1 with cellulose 4 described below at cellulose 1:cellulose 4 (mass ratio)=32:68.

Cellulose 4 was prepared in the same manner as cellulose 1, except that the starting material was changed to unbleached pulp. The properties of the obtained cellulose 4 were evaluated by the methods described above. The results are shown below.

Mean L/D=300

Mean fiber size=85 nm

Degree of crystallinity=80%

Degree of polymerization=550

Acetylated cellulose was prepared by the following procedure.

Using 1 parts by mass of cotton linter pulp and a uniaxial stirrer (DKV-1 φ125 mm Dissolver by Aimex Co.), stirring was carried out for 1 hour at ordinary temperature, 500 rpm in 30 parts by mass of dimethyl sulfoxide (DMSO). The mixture was then fed to a bead mill (NVM-1.5 by Aimex Co.) with a hose pump and circulated for 180 minutes with DMSO alone to prepare a microcellulose fiber slurry, thereby obtaining slurry S1 (DMSO solvent) with a solid content of 3.2 mass %.

During the circulation, the rotational speed of the bead mill was 2500 rpm and the circumferential speed was 12 m/s, while the beads used were made of zirconia with a size of φ2.0 mm and the fill factor was 70% (the slit gap of the bead mill was 0.6 mm). Also during the circulation, the slurry temperature was controlled to 40° C. with a chiller, for absorption of the heat release by abrasion.

The slurry S1 was loaded into an explosion-proof disperser tank, and then 3.2 parts by mass of vinyl acetate and 0.49 parts by mass of sodium hydrogen carbonate were added and the mixture was stirred for 120 minutes with the tank internal temperature at 50° C., to obtain a slurry (DMSO solvent) with a solid content of 2.9 mass %.

To suspend the reaction, 30 parts by mass of purified water was added, and the mixture was thoroughly stirred, placed in a dehydrator and concentrated. A rinsing procedure of re-dispersing, stirring and concentrating the obtained wet cake in 30 parts by mass of purified water was repeated a total of 5 times to remove the unreacted reagent and solvent, obtaining 10 parts by mass of an acetylated cellulose fiber cake with a solid content of 10 mass %.

[Container]

(External Body) (as High-Lignin-Content Member)

External body 1: A bag formed of waste newspaper sheets was used (850 mm length×500 mm width×150 mm thickness, sealed bottom and open top).

External body 2: A kraft paper bag formed of unbleached kraft paper was used (flat bag with 850 mm length×500 mm width×150 mm thickness, sealed bottom and open top).

External body 3: A commercially available cardboard box was used (600 mm length×400 mm width×350 mm height).

(Internal Body) (as Low-Lignin-Content Member)

Internal Body 1: Polypropylene Bag (25 μm Thickness)

A "F109 V" by Prime Polymer Co., Ltd. was used. An extruder was used for melt kneading to form pellets. These were then melt-extruded with an extruder equipped with a T-die and quenched with cooling rolls at 20° C. to obtain a sheet with a thickness of 1500 win. The sheet was then stretched at a temperature of 130° C. using the difference in circumferential speeds of the rolls, to obtain a biaxially stretched polypropylene film with a thickness of 25 μm. It was then bonded into the form of a bag to obtain an internal body 1.

Internal Body 2: Polypropylene Bag (2.5 μm Thickness)

Internal body 2 was obtained in the same manner as internal body 1, except that stretching was carried out to a thickness of 2.5 μm.

Internal Body 3: Polypropylene Bag (75 μm Thickness)

Internal body 3 was obtained in the same manner as internal body 1, except that stretching was carried out to a thickness of 75 μm.

Internal Body 4: Polypropylene Bag (1000 μm Thickness)

Internal body 4 was obtained in the same manner as internal body 1, except that stretching was carried out to a thickness of 1000 μm.

Internal Body 5: High-Density Polyethylene (HDPE) Bag (25 μm Thickness)

Internal body 5 was obtained in the same manner as internal body 1, except that "HY420" by Mitsubishi Chemical Holdings Corp. was used.

Internal Body 6: Low-Density Polyethylene (LDPE) Bag (25 μm Thickness)

Internal body 6 was obtained in the same manner as internal body 1, except that "LF128" by Mitsubishi Chemical Holdings Corp. was used.

Internal Body 7: Low-Density Polyethylene (LDPE) Bag (2.5 μm Thickness)

Internal body 7 was obtained in the same manner as internal body 6, except that stretching was carried out to a thickness of 2.5 μm.

Internal body 8: An aluminum bag (200 μm thickness) ("ALUMI LAMIZIP" by As One Corp.) was used.

Internal Body 9: Polypropylene Bag (100 μm Thickness)

Internal body 9 was obtained in the same manner as internal body 1, except that stretching was carried out to a thickness of 100 μm.

[Production of Cellulose Resin Composition]

(Cellulose Resin Composition 1)

An aqueous dispersion (3 mass %) of cellulose 1 was concentrated to a cellulose proportion of 20 mass % using a centrifugal separator. The concentrated dispersion was dried and then pulverized to obtain powdered cellulose. After mixing polyamide 6 (100 parts by mass) and cellulose 1 (11 parts by mass), melt kneading the mixture with a TEM48SS extruder by Toshiba Machine Co., Ltd. at a screw rotational speed of 350 rpm and a throughput of 140 kg/hr, and vacuum devolatilizing, it was extruded from a die into a strand, cooled in a water bath and pelletized.

(Cellulose Resin Composition 2)

Cellulose resin composition 2 was obtained by the same procedure as for production of cellulose resin composition 1, except that cellulose 2 was used instead of cellulose 1.

(Cellulose Resin Composition 3)

Cellulose resin composition 3 was obtained by the same procedure as for production of cellulose resin composition 1, except that cellulose 3 was used instead of cellulose 1.

(Cellulose Resin Composition 4)

Cellulose resin composition 4 was obtained by the same procedure as for production of cellulose resin composition 1, except that polypropylene was used instead of polyamide 6.

(Comparison Resin Composition 5)

Polyamide 6 was used as comparison resin composition 5.

(Comparison Resin Composition 6)

Polypropylene was used as comparison resin composition 6.

(Cellulose Resin Composition 7)

Cellulose resin composition 7 was obtained by the same procedure as for production of cellulose resin composition 1, except that acetylated cellulose was used instead of cellulose 1.

(Cellulose Resin Composition 8)

Cellulose resin composition 8 was obtained by the same procedure as for production of cellulose resin composition 4, except that acetylated cellulose was used instead of cellulose 1.

[Production of Container]

(Container 1)

Internal body 1 was inserted into external body 1 to obtain container 1 having an external body of waste paper and an internal body of polypropylene (25 μm thickness).

(Container 2)

Internal body 1 was inserted into external body 2 to obtain container 2 having an external body of unbleached kraft paper and an internal body of polypropylene (25 μm thickness).

(Container 3)

Container 3 was obtained by the same procedure as for container 2, except that the internal body was changed to internal body 2 (polypropylene (2.5 μm thickness)).

(Container 4)

Container 4 was obtained by the same procedure as for container 2, except that the internal body was changed to internal body 3 (polypropylene (75 μm thickness)).

(Container 5)

Container 5 was obtained by the same procedure as for container 2, except that the internal body was changed to internal body 4 (polypropylene (1000 μm thickness)).

(Container 6)

Container 6 was obtained by the same procedure as for container 2, except that the internal body was changed to internal body 5 (HDPE (25 μm thickness)).

(Container 7)

Container 7 was obtained by the same procedure as for container 2, except that the internal body was changed to internal body 6 (LDPE (25 μm thickness)).

(Container 8)

Container 8 was obtained by the same procedure as Example 2, except that the internal body was changed to internal body 7 (LDPE (2.5 μm thickness)).

(Container 9)

Container 9 was obtained by the same procedure as Example 2, except that the internal body was changed to internal body 8 (aluminum bag (200 μm thickness)).

(Container 10)

Internal body 1 was inserted into external body 3 to obtain container 10 having an external body of cardboard and an internal body of polypropylene (25 μm thickness).

(Container 11)

Container 11 was obtained by the same procedure as for container 10, except that the internal body was changed to internal body 9 (polypropylene (100 μm thickness)).

(Container 12)

Container 12 was obtained in the same manner as container 2, except that no internal body was provided.

Examples 1 to 18, Comparative Examples 1 to 4, Reference Examples 1 and 2

Using the combinations of cellulose resin compositions or comparison resin compositions with containers as listed in Tables 1 to 3, 25 kg of each cellulose resin composition or comparison resin composition was housed in the container and the opening of the internal body was sealed with tape, to obtain a package for the Example or Comparative Example. Example 8 and Example 9 are cases where the same container and cellulose resin composition were used, but Example 8 differed from Example 9 by having an "initial" temperature of room temperature (23° C.) and standing for 2 hours in air. The construction and evaluation results for the container, cellulose resin composition and package were as shown in Tables 1 to 3.

TABLE 1

|  |  |  | Example 1 | Example 2 | Example 3 | Example 4 | Example 5 |
|---|---|---|---|---|---|---|---|
| Resin composition | Composition No. |  | 1 | 1 | 1 | 1 | 1 |
|  | Base resin | Type | Polyamide | Polyamide | Polyamide | Polyamide | Polyamide |
|  | Cellulose | Type | Cellulose 1 | Cellulose 1 | Cellulose 1 | Cellulose 1 | Cellulose 1 |
|  |  | Lignin content (mass %) | 0 | 0 | 0 | 0 | 0 |

TABLE 1-continued

| Container | Container No. | | 1 | 2 | 10 | 11 | 6 |
|---|---|---|---|---|---|---|---|
| | External body | Type | Waste paper | Unbleached kraft paper | Cardboard | Cardboard | Unbleached kraft paper |
| | | Lignin content (mass %) | 21 | 29 | 33 | 33 | 29 |
| | | YI | 73 | 85 | 101 | 101 | 85 |
| | Internal body | Type | PP | PP | PP | PP | HDPE |
| | | Lignin content (mass %) | 0 | 0 | 0 | 0 | 0 |
| | | Thickness (μm) | 25 | 25 | 25 | 100 | 25 |
| | | Water vapor permeability (g/m² · 24 h) | 15 | 15 | 15 | 3.8 | 5 |
| Water absorption percentage | | Initial (ppm) | 500 | 500 | 500 | 500 | 500 |
| | | After 1 day storage (ppm) | 900 | 900 | 900 | 600 | 900 |
| YI of resin composition | | Initial | 21 | 21 | 21 | 21 | 21 |
| | | After high-temperature, high-humidity aging for 720 h | 23 | 25 | 27 | 23 | 21 |
| | | ΔYI | 2 | 4 | 6 | 2 | 0 |
| Odor during molding | | | Good | Good | Good | Good | Good |
| Moldability | | | Good | Good | Good | Good | Good |

| | | | Example 6 | Example 7 | Example 8 | Example 9 |
|---|---|---|---|---|---|---|
| Resin composition | Composition No. | | 1 | 1 | 1 | 1 |
| | Base resin | Type | Polyamide | Polyamide | Polyamide | Polyamide |
| | Cellulose | Type | Cellulose 1 | Cellulose 1 | Cellulose 1 | Cellulose 1 |
| | | Lignin content (mass %) | 0 | 0 | 0 | 0 |
| Container | Container No. | | 7 | 8 | 9 | 9 |
| | External body | Type | Unbleached kraft paper | Unbleached kraft paper | Unbleached kraft paper | Unbleached kraft paper |
| | | Lignin content (mass %) | 29 | 29 | 29 | 29 |
| | | YI | 85 | 85 | 85 | 85 |
| | Internal body | Type | LDPE | LDPE | Aluminum bag | Aluminum bag |
| | | Lignin content (mass %) | 0 | 0 | 0 | 0 |
| | | Thickness (μm) | 25 | 2.5 | 200 | 200 |
| | | Water vapor permeability (g/m² · 24 h) | 19 | 190 | 0 | 0 |
| Water absorption percentage | | Initial (ppm) | 500 | 500 | 1500 | 500 |
| | | After 1 day storage (ppm) | 900 | 900 | 1500 | 500 |
| YI of resin composition | | Initial | 21 | 21 | 21 | 21 |
| | | After high-temperature, high-humidity aging for 720 h | 27 | 42 | 21 | 21 |
| | | ΔYI | 6 | 21 | 0 | 0 |
| Odor during molding | | | Good | Good | Good | Good |
| Moldability | | | Good | Good | Good | Good |

TABLE 2

| | | | Example 10 | Example 11 | Example 12 | Example 13 | Example 14 |
|---|---|---|---|---|---|---|---|
| Resin composition | Composition No. | | 2 | 3 | 3 | 1 | 1 |
| | Base resin | Type | Polyamide | Polyamide | Polyamide | Polyamide | Polyamide |
| | Cellulose | Type | Cellulose 2 | Cellulose 3 | Cellulose 4 | Cellulose 1 | Cellulose 1 |
| | | Lignin content (mass %) | 10 | 19 | 28 | 0 | 0 |
| Container | Container No. | | 2 | 2 | 2 | 3 | 4 |
| | External body | Type | Unbleached kraft paper | Unbleached kraft paper | Unbleached kraft paper | Unbleached kraft paper | Unbleached kraft paper |
| | | Lignin content (mass %) | 29 | 29 | 29 | 29 | 29 |
| | | YI | 85 | 85 | 85 | 85 | 85 |

TABLE 2-continued

|  |  |  |  |  |  |  |  |
|---|---|---|---|---|---|---|---|
|  | Internal body | Type | PP | PP | PP | PP | PP |
|  |  | Lignin content (mass %) | 0 | 0 | 0 | 0 | 0 |
|  |  | Thickness (μm) | 25 | 25 | 25 | 2.5 | 75 |
|  |  | Water vapor permeability (g/m² · 24 h) | 15 | 15 | 15 | 150 | 45 |
| Water absorption percentage |  | Initial (ppm) | 500 | 500 | 500 | 500 | 500 |
|  |  | After 1 day storage (ppm) | 890 | 870 | 800 | 3000 | 990 |
| YI of resin composition |  | Initial | 30 | 35 | 42 | 21 | 21 |
|  |  | After high-temperature, high-humidity aging for 720 h | 38 | 50 | 67 | 39 | 28 |
|  |  | ΔYI | 8 | 15 | 25 | 18 | 7 |
| Odor during molding |  |  | Good | Acceptable | Acceptable | Good | Good |
| Moldability |  |  | Good | Good | Good | Poor | Good |

|  |  |  | Example 15 | Example 16 | Comparative Example 1 | Comparative Example 2 |
|---|---|---|---|---|---|---|
| Resin composition | Composition No. |  | 1 | 4 | 1 | 4 |
|  | Base resin | Type | Polyamide | PP | Polyamide | PP |
|  | Cellulose | Type | Cellulose 1 | Cellulose 1 | Cellulose 1 | Cellulose 1 |
|  |  | Lignin content (mass %) | 0 | 0 | 0 | 0 |
| Container | Container No. |  | 5 | 2 | 12 | 12 |
|  | External body | Type | Unbleached kraft paper | Unbleached kraft paper | Unbleached kraft paper | Unbleached kraft paper |
|  |  | Lignin content (mass %) | 29 | 29 | 29 | 29 |
|  |  | YI | 85 | 85 | 85 | 85 |
|  | Internal body | Type | PP | PP | — | — |
|  |  | Lignin content (mass %) | 0 | 0 | — | — |
|  |  | Thickness (μm) | 1000 | 25 | — | — |
|  |  | Water vapor permeability (g/m² · 24 h) | 0.4 | 15 | — | — |
| Water absorption percentage |  | Initial (ppm) | 500 | 10 | 500 | 10 |
|  |  | After 1 day storage (ppm) | 550 | 50 | 3000 | 100 |
| YI of resin composition |  | Initial | 21 | 10 | 21 | 10 |
|  |  | After high-temperature, high-humidity aging for 720 h | 21 | 15 | 87 | 42 |
|  |  | ΔYI | 0 | 5 | 66 | 32 |
| Odor during molding |  |  | Good | Good | Poor | Acceptable |
| Moldability |  |  | Good | — | Poor | — |

TABLE 3

|  |  |  | Reference Example 1 | Reference Example 2 | Example 17 | Comparative Example 3 | Example 18 | Comparative Example 4 |
|---|---|---|---|---|---|---|---|---|
| Resin composition | Composition No. |  | 5 | 6 | 7 | 7 | 8 | 8 |
|  | Base resin | Type | Polyamide | PP | Polyamide | Polyamide | PP | PP |
|  | Cellulose | Type | — | — | Acetylated cellulose | Acetylated cellulose | Acetylated cellulose | Acetylated cellulose |
|  |  | Lignin content (mass %) | — | — | 0 | 0 | 0 | 0 |
| Container | Container No. |  | 12 | 12 | 2 | 12 | 2 | 12 |
|  | External body | Type | Unbleached kraft paper | Unbleached kraft paper | Unbleached kraft paper | Unbleached kraft paper | Unbleached kraft paper | Unbleached kraft paper |
|  |  | Lignin content (mass %) | 29 | 29 | 29 | 29 | 29 | 29 |
|  |  | YI | 85 | 85 | 85 | 85 | 85 | 85 |

TABLE 3-continued

| | | Reference Example 1 | Reference Example 2 | Example 17 | Comparative Example 3 | Example 18 | Comparative Example 4 |
|---|---|---|---|---|---|---|---|
| Internal body | Type | — | — | PP | — | PP | — |
| | Lignin content (mass %) | — | — | 0 | — | 0 | — |
| | Thickness (μm) | — | — | 25 | — | 25 | — |
| | Water vapor permeability (g/m² · 24 h) | — | — | 15 | — | 15 | — |
| Water absorption percentage | Initial (ppm) | 500 | 10 | 500 | 500 | 10 | 10 |
| | After 1 day storage (ppm) | 3000 | 10 | 790 | 3000 | 30 | 100 |
| YI of resin composition | Initial | 1 | 1 | 18 | 18 | 8 | 8 |
| | After high-temperature, high-humidity aging for 720 h | 11 | 1 | 22 | 78 | 10 | 38 |
| | ΔYI | 10 | 0 | 4 | 60 | 2 | 30 |
| Odor during molding | | — | — | Good | Poor | Good | Poor |
| Moldability | | — | — | Good | Poor | — | — |

Based on the results in Tables 1 to 3 it is seen that using a container comprising a combination of a high-lignin-content member and a low-lignin-content member can satisfactorily inhibit yellowing of cellulose resin compositions, and also water absorption.

INDUSTRIAL APPLICABILITY

The container of the present invention can inhibit discoloration of a cellulose resin composition, and is therefore particularly suitable for the purpose of housing a cellulose resin composition.

The invention claimed is:

1. A package comprising a container and a cellulose resin composition that includes a thermoplastic resin and cellulose, housed in the container, wherein:
    the container comprises a high-lignin-content member with a lignin content of 10 mass % or greater and a low-lignin-content member with a lignin content of 1 mass % or lower, and
    the whole of the surface of the container to be in contact with the cellulose resin composition is constituted of the low-lignin-content member.
2. The package according to claim 1, wherein the lignin content of the cellulose is 20 mass % or lower.
3. The package according to claim 2, wherein:
    the lignin content (Lo) of the high-lignin-content member, the lignin content (Li) of the low-lignin-content member and the lignin content (Lc) of the cellulose satisfy the relationship represented by the following formula:

$$Lo > Lc \geq Li.$$

4. The package according to claim 1, wherein the water vapor permeability of the low-lignin-content member as measured by the method of JIS Z0208:1976 is 50 g/m²·24 h or lower.
5. The package according to claim 1, which comprises an external body composed of the high-lignin-content member and an internal body composed of the low-lignin-content member.
6. The package according to claim 1, wherein:
    the external body is a box or bag, and
    the internal body is a sheet that is either anchored or not anchored to the external body.
7. The package according to claim 1, wherein the yellowness index (YI) of the high-lignin-content member is 20 or greater.
8. The package according to claim 1, wherein the high-lignin-content member is a paper material obtained from unbleached pulp and/or waste paper.
9. The package according to claim 1, wherein the cellulose is cellulose nanofibers.
10. The package according to claim 1, wherein the cellulose resin composition is in the form of pellets.
11. The package according to claim 1, wherein 0.01 kg to 550 kg of the cellulose resin composition is housed in the container.
12. The package according to claim 1, wherein the water absorption percentage of the cellulose resin composition as measured by the method of JIS K0113:2005 is 1000 ppm by mass or lower.
13. The package according to claim 1, wherein when the package is subjected to high-temperature, high-humidity treatment for 720 hours in air at ordinary pressure at a temperature of 60° C. and a relative humidity of 75%, the difference between the yellowness index (YI) before high-temperature, high-humidity treatment and the yellowness index (YI) after high-temperature, high-humidity treatment of the cellulose resin composition is 20 or less.
14. The package according to claim 1, wherein the thermoplastic resin excludes a polyester-based resin.
15. The package according to claim 1, wherein the thermoplastic resin excludes polylactic acid (PLA).
16. A container for containing a cellulose resin composition that includes a thermoplastic resin and cellulose, wherein:
    the container comprises a high-lignin-content member with a lignin content of 10 mass % or greater and a low-lignin-content member with a lignin content of 1 mass % or lower, and
    the whole of the surface of the container to be in contact with the cellulose resin composition is constituted of the low-lignin-content member.
17. The container according to claim 16, wherein:
    the lignin content (Lc) of the cellulose is 20 mass % or lower, and
    the lignin content (Lo) of the high-lignin-content member, the lignin content (Li) of the low-lignin-content member and the lignin content (Lc) of the cellulose satisfy the relationship represented by the following formula:

$$Lo > Lc \geq Li.$$

18. The container according to claim 16, wherein the water vapor permeability of the low-lignin-content member as measured by the method of JIS Z0208:1976 is 50 g/m$^2$·24 h or lower.

19. The container according to claim 16, which comprises an external body composed of the high-lignin-content member and an internal body composed of the low-lignin-content member.

20. The container according to claim 16, wherein:
the external body is a box or bag, and
the internal body is a sheet that is either anchored or not anchored to the external body.

21. The container according to claim 16, wherein the yellowness index (YI) of the high-lignin-content member is 20 or greater.

22. The container according to claim 16, wherein the high-lignin-content member is a paper material obtained from unbleached pulp and/or waste paper.

23. The container according to claim 16, wherein the low-lignin-content member includes a polyolefin.

* * * * *